Patented Nov. 8, 1938

2,135,793

UNITED STATES PATENT OFFICE 2,135,793

PROCESS OF POLYMERIZING OLEFINES AND CATALYST THEREFOR

Lloyd F. Brooke, Berkeley, Calif., assignor to Standard Oil Company of California, San Francisco, Calif., a corporation of Delaware No Drawing. Application March 9, 1936, Serial No. 67,921

3 Claims. (Cl. 196—10)

This invention relates to a process for the polymerization of normally gaseous olefine hydrocarbons to liquid motor fuels and more particularly to a process wherein an especially prepared catalyst is employed.

The possibility of polymerizing gaseous olefine hydrocarbons to liquids, while long recognized, has only become of considerable economic interest with the development of the petroleum cracking industry in which large quantities of the lighter unsaturates are produced as a low value by-product. Various thermal and catalytic methods have, however, now been proposed for converting such raw material into valuable commercial products. Among the more promising catalytic methods are those which employ the strong acids in one form or another as the polymerizing agent.

It has long been known that phosphoric acid and certain of its derivatives have the ability under a wide range of conditions to polymerize olefines containing from two to about five carbon atoms. Recently it has been further found that when the conditions of polymerization with a phosphoric type catalyst are correctly chosen and properly controlled a polymer product may be produced from such materials which has certain outstanding advantages in the preparation of high antiknock motor fuels.

Still more recently an advance has been made in the production of such liquid fuels of low average boiling point through the use of an extremely satisfactory form of catalyst which departs radically from certain of the accepted ideas of heterogeneous contact catalysis in that instead of the usual highly porous contact mass an entirely non-porous, non-reactive material is employed to support a thin film of liquid phosphoric acid. Broken or otherwise subdivided nonporous silica or quartz is typical of the kind of support which may be employed in this type of catalyst.

The catalysts of this newer type are extremely rugged, capable of long continued use without deterioration, capable of simple and easy regeneration when such becomes necessary and are by far the most economical of any yet proposed which employ an acid of phosphorus or its derivative as the active polymerizing ingredient.

The phosphoric acids in which phosphorus has a valence of +5 begin to show appreciable activity in polymerizing the gaseous olefines at about 80% $H_3PO_4$ or 58% $P_2O_5$ in water and exhibit a rather flat maximum activity between about 95 and 115% $H_3PO_4$, corresponding to 68–83% $P_2O_5$. The more efficient catalysts of the above described type thus comprise a film of about 100–110% $H_3PO_4$, 72.5–80% $P_2O_5$ in water disposed on an appropriate support. Such acids are, however, entirely too viscous at ordinary or even at moderately elevated temperatures to permit of ready distribution in a thin uniform film on a granular support and being truly strong acids they are too corrosive to be conveniently manipulated in quantity at temperatures at which they become adequately fluid. The task of distributing acid of active polymerizing strength over a support in the desired thin, uniform film thus becomes a real problem when a phosphoric acid-film catalyst must be prepared in commercial scale quantities.

It is the object of the present invention to provide a method whereby strong phosphoric acid-film catalysts may be simply and conveniently prepared in any quantity without danger of damage either to operator or equipment and at the same time a method which is particularly advantageous by reason of being an integral part of the polymerization process in which the catalyst is to be employed.

With supported phosphoric acid films in the optimum polymerizing concentration range of about 72.5–80% $P_2O_5$ the temperature which may be employed in polymerizing the normally gaseous olefines falls between about 50° and 500° F. since below 50° the rate of polymerization of even the more reactive olefines is impractically low while at 500° and above phosphoric acid of this strength is rapidly carbonized through oxidation of the hydrocarbons present.

Within the range from 50° to 500° F. the most suitable temperature of operation depends both upon the identity and proportion of olefines present in the gas undergoing polymerization treatment and upon the characteristics which are particularly desirable in the product to be formed. When, for instance, the gas is a typical one from a liquid phase petroleum cracking operation and contains ethylene, propylene and the three isomeric butenes and it is desirable to produce a liquid motor fuel of the highest possible antiknock value it will be found necessary to operate at a relatively low temperature such as 100° to 250° F. where preferential polymerization of isobutene is effected. When a maximum yield of liquid fuel having a high average antiknock value is desired a somewhat higher temperature of reaction may be employed, as from 250° to 400° F. When a gas having a narrower boiling range such as a butane-butene fraction is available an average temperature of about 300° F. may preferably be employed.

Since the vapor pressure of water over phosphoric acid corresponding to 72.5 to 80% $P_2O_5$ will vary between rather wide limits within the above range of desirable operation in the catalytic polymerization process it has been found necessary to adjust the partial water vapor pressure in the olefine containing feed to correspond to the vapor pressure of the acid catalyst at the preferred temperature of operation in order that the catalyst may be maintained constant, or at least within the range of optimum activity, throughout any given run. A satisfactory approximation of the moisture content to be maintained in the feed for any possible desirable conditions of operation may be arrived at from an application of the rule that the logarithm of vapor pressure varies inversely with the reciprocal of absolute temperature when the vapor pressure of two or more concentrations of acid each at two temperatures is known. To this end the following data, selected to substantially cover the optimum range of acid concentration and temperature, are presented.

*Water vapor pressure over phosphoric acid solutions*

| Acid | °F | Mm. Hg. | °F | Mm. Hg. |
|---|---|---|---|---|
| 99.8% $H_3PO_4$, 72.2% $P_2O_5$ | 140 | 0.14 | 400 | 100.0 |
| 109.5% $H_3PO_4$, 79.4% $P_2O_5$ | 230 | 0.04 | 540 | 70.0 |

As has already been intimated the large bulk of immediately available gaseous olefines is produced as a by-product of the cracking of petroleum oils. Such gases are usually contaminated by materials that are not pure hydrocarbons and which if not removed prior to the polymerization reaction tend to poison the catalyst or contaminate the product or both. It has been found that appropriate scrubbing of the gas with a dilute acid solution followed by any convenient alkaline solution will usually effect adequate purification.

Obviously any adjustment of the humidity of the gas must follow rather than precede any purification in which aqueous solutions are employed. Having thus purified and regulated the moisture content of a gas it is ready for passage to the catalyst chamber.

According to the present invention such chambers of convenient form, usually long cylinders of relatively small diameter, are filled with the non-porous, inert solid material which is to be used to support the film of strong polymerizing acid. Relatively weak acid such as 75–80% $H_3PO_4$, which is widely available in quantity and which is adequately fluid and also sufficiently dilute to be handled without great difficulty at normal temperature, is then run over the inert support and allowed to drain until substantially no liquid acid remains in the system except the film with which the surface of the supporting material is wet. Gas prepared for polymerization as herein above described is then passed through the catalyst chamber and the temperature more or less gradually brought up to the point at which it is desired to effect polymerization. The dilute acid in the thin film will thus be smoothly and automatically concentrated to the desired degree and as its strength increases polymerization will gradually increase and the process be brought into full operation.

While any non-porous solid which is not reacted upon by phosphoric acid corresponding to 55–85% $P_2O_5$ at temperatures up to about 500° F. would be suitable as the acid support in such operation, but few materials are known which meet these severe requirements. Illium metal, certain of the high chrome-molybdenum alloy steels, silica or quartz and graphite may be mentioned among the more satisfactory substances of which glassy quartz probably best meets all requirements.

Whatever the material, it should be in such subdivided form as to present a maximum surface area per unit of volume and yet permit the free passage of gas, at velocities consistent with the rate of the polymerization reaction, through beds of considerable thickness. Broken quartz fragments screened to 4–20 and preferably 10–20 mesh have been found admirably to meet all of the foregoing requirements.

When 10–20 mesh quartz is employed as the support and the acid film is prepared as above described acid corresponding, on the average, to about 3.5 pounds of $P_2O_5$ will be retained per gross cubic foot, thus providing a catalyst of very low materials cost. This coupled with the extreme simplicity of the method employed in preparation and the ruggedness and long active life of the catalyst results in an exceedingly low element of catalyst cost chargeable against the polymer product produced by the present process.

While the operation of the process as a whole, including the catalyst preparation step, may be quite satisfactorily carried out at atmospheric pressure, pressures above atmospheric are usually desirable. An economic balance between the advantage of increased polymerization rate and small plant size resulting from high pressure operation and the increased cost of pressure equipment and gas compression leads to operation at about 200 pounds per square inch gauge though obviously such optimum figure will vary somewhat with circumstances.

Having described a useful process for the catalytic polymerization of gaseous olefines which comprises a novel and highly desirable step by which the catalyst may be simply and expeditiously prepared in place, I claim:

1. The method of preparing a phosphoric acid film-type catalyst for polymerizing normally gaseous olefines which comprises the steps of disposing particles of non-porous inert solid of appropriate dimensions in a catalyst chamber, completely wetting said particles with a weak aqueous phosphoric acid solution containing not substantially in excess of 80% $H_3PO_4$, causing excess liquid to drain from said particles, and concentrating said acid in place by passing thereover gas containing a partial pressure of water vapor substantially equal to that exerted by 100% to 110% $H_3PO_4$ at the temperature at which the catalyst is to be employed.

2. The method of preparing a phosphoric acid film-type polymerization catalyst as a step in a process for the polymerization of normally gaseous olefine hydrocarbons which comprises disposing particles of non-porous inert solid in a catalyst chamber, completely wetting said particles with a weak aqueous phosphoric acid solution containing not substantially in excess of 80% $H_3PO_4$, causing excess liquid acid to drain from said particles, and concentrating the adsorbed acid film in place by passing thereover the olefine containing gas to be polymerized containing a partial pressure of water vapor substantially equal to that exerted by an aqueous solution of 68% to 83% $P_2O_5$ at the polymerization temperature to be employed.

3. The method described in claim 2 further characterized in that the film supporting particles are of non-porous silica and the acid concentrating step is at substantially the temperature of the desired polymerization reaction.

LLOYD F. BROOKE.